United States Patent
Keizer et al.

(10) Patent No.: US 9,514,775 B2
(45) Date of Patent: Dec. 6, 2016

(54) REDUCING EFFECT OF FREQUENCY ACQUISITION ERROR IN A POSITION ERROR SIGNAL RESPONSIVE TO SPLIT SERVO BURST PATTERNS

(75) Inventors: Richard Lyle Keizer, Minnetonka, MN (US); Mustafa Can Ozturk, Bloomington, MN (US); Puskal Prasad Pokharel, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 1629 days.

(21) Appl. No.: 12/357,168

(22) Filed: Jan. 21, 2009

(65) Prior Publication Data

US 2010/0128386 A1  May 27, 2010

Related U.S. Application Data

(60) Provisional application No. 61/117,719, filed on Nov. 25, 2008.

(51) Int. Cl.
*G11B 5/596* (2006.01)

(52) U.S. Cl.
CPC .................. *G11B 5/59688* (2013.01)

(58) Field of Classification Search
CPC ...................... G11B 5/59688; G11B 5/596

USPC ........ 360/29, 77.07, 77.08, 78.04, 55, 77.06
See application file for complete search history.

(56) References Cited

U.S. PATENT DOCUMENTS

| | | | |
|---|---|---|---|
| 4,549,232 A | 10/1985 | Axmear et al. | |
| 4,587,579 A | 5/1986 | Cocke et al. | |
| 4,912,576 A | 3/1990 | Janz | |
| 5,615,065 A | 3/1997 | Cheung | |
| 5,774,298 A | 6/1998 | Cheung et al. | |
| 6,195,220 B1 | 2/2001 | Ellis et al. | |
| 6,324,030 B1 | 11/2001 | Cheung et al. | |
| 6,366,423 B1 | 4/2002 | Ahn | |
| 6,381,088 B1* | 4/2002 | Despain et al. | 360/77.06 |
| 7,167,329 B2 | 1/2007 | Baker | |
| 7,209,314 B2 | 4/2007 | Bandic et al. | |
| 2010/0053800 A1* | 3/2010 | Ozturk et al. | 360/77.07 |
| 2010/0067142 A1* | 3/2010 | Pokharel et al. | 360/77.08 |

* cited by examiner

*Primary Examiner* — Fred Tzeng
(74) *Attorney, Agent, or Firm* — Faegre Baker Daniels LLP (57) ABSTRACT

In a servo control loop, servo burst signals that are read from a plurality of servo burst patterns that include a split servo burst pattern contain frequency acquisition error. The frequency acquisition error is at least partially removed to generate a frequency acquisition error compensated position error signal (PES).

20 Claims, 5 Drawing Sheets

REDUCING EFFECT OF FREQUENCY ACQUISITION ERROR IN A POSITION ERROR SIGNAL RESPONSIVE TO SPLIT SERVO BURST PATTERNS

This application claims the benefit of and priority to U. S. Provisional Patent Application No. 61/117,719, filed Nov. 25, 2008, the disclosure of which is hereby incorporated herein by reference as if set forth in its entirety.

BACKGROUND

The present invention generally relates to controlling transducer movement and, more particularly, to controlling transducer movement responsive to a position error signal within a servo control loop.

A typical data storage disk drive includes a plurality of magnetic recording disks which are mounted to a rotatable hub of a spindle motor and rotated at a high speed. An array of read/write heads is disposed adjacent to surfaces of the disks to transfer data between the disks and a host device. The heads can be radially positioned over the disks by a rotary actuator and a closed loop servo system.

The servo system can operate in two primary modes: seeking and track following. During a seek, a selected head is moved from an initial track to a target track on the corresponding disk surface. Upon reaching the target track, the servo system enters the track following node wherein the head is maintained over the center of the target track while data is written/read. During track following, prerecorded servo burst fields are sensed by the head and demodulated to generate a position error signal (PES), which provides an indication of the position error of the head away from a desired location along the track (e.g., the track center). The PES is then converted into an actuator control signal, which is fed back to a head actuator that positions the head.

As the areal density of magnetic disc drives increases, so does the need for more precise position control when track following, especially in the presence of vibrations which can cause non-repeatable runout (NRRO) of the position error.

SUMMARY

In a servo control loop, servo burst signals that are read from a plurality of servo burst patterns that include a split servo burst pattern contain frequency acquisition error. The frequency acquisition error is at least partially removed to generate a frequency acquisition error compensated position error signal (PES) component.

In some embodiments, a circuit includes a demodulation module that at least partially removes the effect of frequency acquisition error on PES using servo readback signals read from a sequence of at least one part of a split first servo burst pattern, a second servo burst pattern, and another part of the split first servo burst pattern on a moving storage media to generate a frequency acquisition error compensated position error signal.

In some other embodiments, the effect of frequency acquisition error on PES is at least partially removed using a sequence of at least one part of a split first servo burst pattern, a second servo burst pattern, and another part of the split first servo burst pattern on a moving storage media to generate a frequency acquisition error compensated position error signal.

In some other embodiments, a servo controller circuit includes a demodulation module and a servo control module. The demodulation module at least partially removes effect of frequency acquisition error on PES using a sequence of at least one part of a split first servo burst pattern, a second servo burst pattern, and another part of the split first servo burst pattern on a moving storage media to generate a frequency acquisition error compensated position error signal. The servo control module controls movement of a read/write head relative to a track on the storage media in response to the frequency acquisition error compensated position error signal.

DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "circuit" and "module" may take the form of digital circuitry, such as computer-readable program code executed by a processor (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that positions a sensor responsive to servo control burst patterns on a movable medium.

Figure 1:
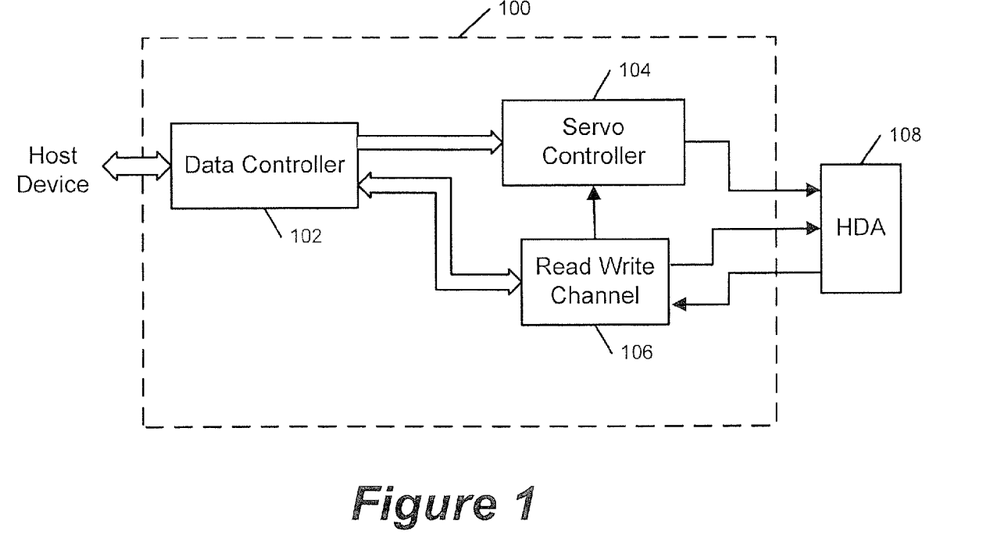
FIG. 1 is a block diagram of disk drive electronic circuits that include a servo controller that is configured in accordance with some embodiments.

FIG. 1 is a block diagram of disk drive electronic circuits 100 which include a data controller 102, a servo controller 104, and a read write channel 106. Although two separate controllers 102 and 104 and a read write channel 106 have been shown for purposes of illustration and discussion, it is to be understood that their functionality described herein may be integrated within a common integrated circuit package or distributed among more than one integrated circuit package. A head disk assembly (HDA) 108 can include a plurality of data storage disks, a plurality of heads (an exemplary type of data sensor) mounted to respective arms and which are moved radially across different data storage surfaces of the disks by a head actuator (e.g., voice coil motor), and a spindle motor which rotates the disks.

Write commands and associated data from a host device can be buffered by the data controller 102. The host device can include, but is not limited to, a desktop computer, a laptop computer, a personal digital assistant (PDA), a digital video recorder/player, a digital music recorder/player, and/or another electronic device that can be communicatively coupled to store and retrieve data in the HDA 108. The data controller 102 carries out buffered write commands by formatting the associated data into blocks with the appropriate header information, and transfers the formatted data via the read/write channel 106 to logical block addresses (LBAs) on a disk in the HDA 108 identified by the associated write command.

The read write channel 106 can convert data between the digital signals processed by the data controller 102 and the analog signals conducted through the heads in the HDA 108. The read write channel 106 provides a read signal including servo burst fields read from servo bursts on a selected disk surface to the servo controller 104. The servo burst fields can be used to detect the radial location of the head relative to tracks on the disk surface. The servo controller 104 uses the servo burst fields to maintain the head alignment with a defined track while data is written/read along the track on the disk surface (i.e., track following mode).

In accordance with some embodiments, the servo controller 104 at least partially removes the effect of frequency acquisition error on PES using a sequence of servo burst patterns, which includes at least one split servo burst pattern, to generate a frequency acquisition error compensated servo position error signal (PES), and positions the head relative to a track centerline in response to the PES. The split servo burst pattern can be formed by splitting a conventional Null servo burst pattern into two or more partial servo burst patterns that are interspersed with other whole or partial other servo burst patterns therebetween. An exemplary Null servo burst pattern is described in U.S. Pat. No. 6,195,220, the entire contents of which are incorporated by reference herein.

Figure 2:
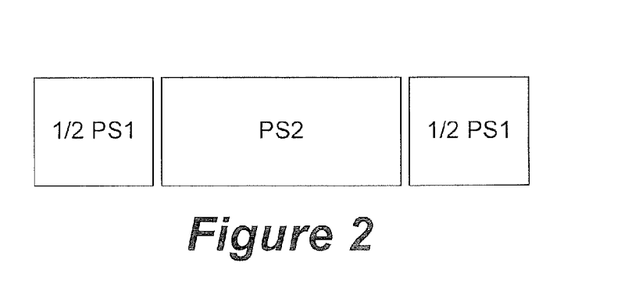
FIG. 2 illustrates at least a part of a split servo burst pattern that is configured in accordance with some embodiments.

FIG. 2 illustrates an embodiment of at least a part of a servo burst pattern in accordance with some embodiments. Referring to FIG. 2, a first servo burst pattern PS1 (e.g., a Null servo burst pattern) is split into two parts (e.g., equal parts) that are spaced apart along one side of a track centerline 200 with a second servo burst pattern PS2 (e.g., another Null servo burst pattern) on the other side of the track centerline 200 and positioned between the two equal parts of the first servo burst pattern. Accordingly, as a read head moves along the track centerline 200, it generates a servo burst signal in response to the split first servo burst pattern, then responsive to the second servo burst pattern, and then responsive to the other part of the split first servo burst pattern.

Figure 3:
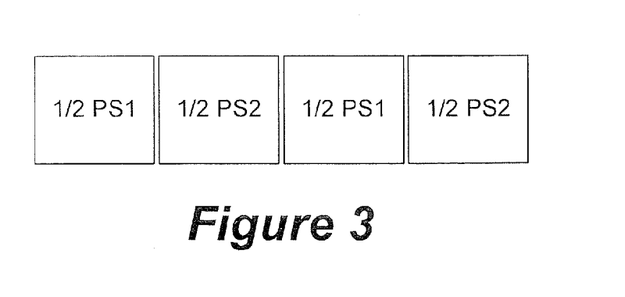
FIG. 3 illustrates at least a part of a split servo burst pattern that is configured in accordance with some other embodiments.

FIG. 3 illustrates another embodiment of at least part of a servo burst pattern in accordance with some other embodiments. Referring to FIG. 3, a first servo burst pattern PS1 and a second servo burst pattern PS2 (e.g., both Null servo burst patterns) are both split into two parts (e.g., equal parts) that are spaced apart along opposite sides of a track centerline 300 and which are arranged in an alternating sequence (e.g. ½ PS1, ½PS2, ½PS1, ½PS2). Accordingly, as a read head moves along the track centerline 300, it generates a servo burst signal in response to the split first servo burst pattern, then responsive to the split second servo burst pattern, then responsive to the other part of the split first servo burst pattern, and then responsive to the other part of the split second servo burst pattern.

Although FIGS. 2 and 3 illustrate exemplary split servo burst patterns for purposes of explanation, it is understood that the invention is not limited thereto. Instead, any number of split servo burst patterns each including two or more fractional parts that are spread apart with intervening whole and/or split servo burst patterns therebetween may reside in servo sectors to define the radial locations of tracks in accordance with various embodiments. Moreover, it is to be understood that the servo burst patterns may be split into unequal parts.

In accordance with some further embodiments, the servo controller 104 generates a sinusoidal component vector for each of the parts of the split first servo burst pattern and for the second servo burst pattern as the head reads across a servo sector. The servo controller 104 combines the component vectors for each of parts of the split first servo burst pattern to generate a synthetic component vector that represents a combination of the parts of the split first servo burst pattern. The servo controller 104 interpolates among phase angles of the parts of the split first servo burst pattern to generate the synthetic component vector. The servo controller 104 determines a rotation matrix with a phase angle that reduces a sum of squares of the first and second synthetic cosine components, and rotates the first and second synthetic pairs of sine and cosine components in response to the rotation matrix to generate phase rotated synthetic pairs of sine and cosine components, and generates the frequency acquisition error compensated position error signal using the phase rotated synthetic pairs of sine and cosine components.

Although various operations for compensating for frequency acquisition error are described herein in the context of being carried out by the servo controller 104 and components thereof for ease of explanation and without limitation, they may additionally or alternatively be carried out by the read write channel 106 and/or other components of the disk drive circuitry 100.

Figure 5:
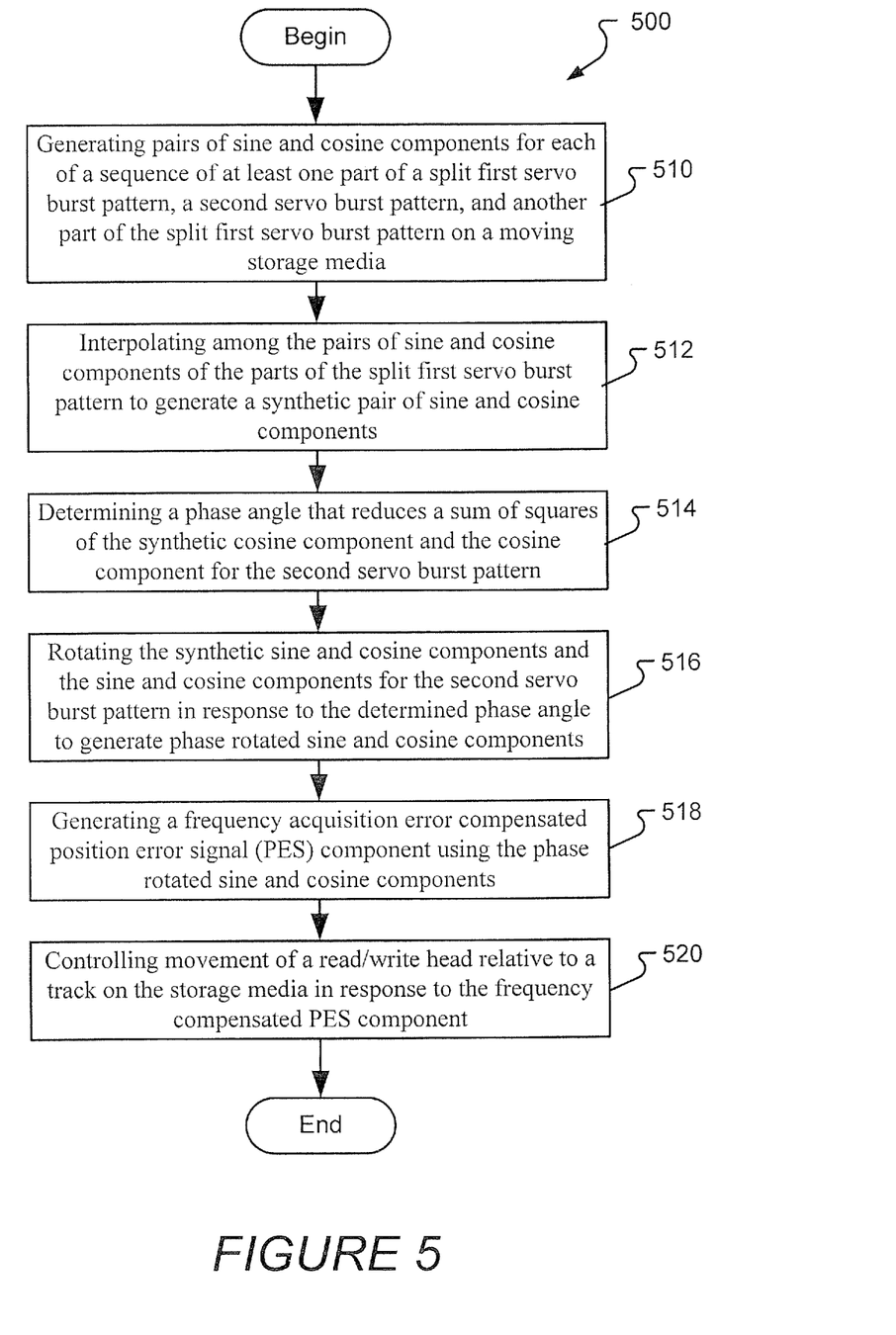
FIG. 5 is a flowchart of operations that at least partially remove the effect of frequency acquisition error from servo burst signals that are read from a sequence of servo burst patterns, which includes at least one split servo burst pattern, to generate a frequency acquisition error compensated position error signal in accordance with some embodiments.

FIG. 5 is a flowchart of more particular operations 500 that may be carried out to at least partially removing frequency acquisition error from servo burst signals that are read from a sequence of servo burst patterns that includes at least one split servo burst pattern in order to generate a frequency acquisition error compensated position error signal in accordance with some embodiments. Referring to FIG. 5, the servo controller 104 generates (block 510) pairs of sine and cosine components for each of the parts of the split first servo burst pattern and for the second servo burst pattern, and determines frequency acquisition error responsive to a phase relationship between the pairs of sine and cosine components. The servo controller 104 interpolates (block 512) among the pairs of sine and cosine components for each of the parts of the split first servo burst pattern to generate a synthetic pair of sine and cosine components. The servo controller 104 determines (block 514) a phase angle that reduces a sum of squares of the synthetic cosine component and the cosine component for the second servo burst pattern. The servo controller 104 rotates (block 516) the synthetic sine and cosine components and the sine and cosine components for the second servo burst pattern in response to the determined phase angle to generate phase rotated sine and cosine components, and generates (block 518) the frequency acquisition error compensated position error signal using the phase rotated sine and cosine components. These and other operations may be carried out by, for example, post-processing the sine and cosine components in the servo controller 104 and/or within the servo read channel 106. The servo controller 104 then controls movement (block 520) of the head relative to a track on the moving media in response to the frequency acquisition error compensated position error signal.

In some further embodiments, the servo controller 104 generates a sinusoidal component vector for each part of the split first and second servo burst patterns and interpolates among phase angles of the parts of the first servo burst pattern to generate a first synthetic component vector. The servo controller 104 then interpolates among phase angles of the parts of the second servo burst pattern to generate a second synthetic component vector, and determines a rotation matrix with a phase angle that reduces a sum of squares of the first and second synthetic cosine components. The servo controller 104 then rotates the first and second synthetic pairs of sine and cosine components in response to the rotation matrix to generate phase rotated synthetic pairs of sine and cosine components, and generates the frequency acquisition error compensated position error signal using the phase rotated first and second synthetic pairs of sine and cosine components.

When the first and second servo burst patterns both include split servo bursts, such as shown in FIG. 3, the servo controller 104 generates pairs of sine (SIN) and cosine (COS) components obtained from a DFT (discrete Fourier transform) of the readback signal sampled at the pattern frequency by an analog-to-digital converter for each part of the split first and second servo burst patterns, and interpolates among the pairs of sine and cosine components of the split first servo burst patterns to generate a first synthetic pair of sine and cosine components.

Using one or more of these embodiments to at least partially remove the effects of frequency acquisition error in the generated position error signal, the accuracy at which the PES indicates the radial location of a head may be increased, which may enable the servo controller 104 to position the head with greater accuracy relative to tracks on the disk. One or more of these embodiments may improve the performance of the servo burst demodulation processes. Moreover, decreasing the effects of frequency acquisition error on the PES from a particular servo sector may improve seek/track following initialization processes that are carried out for the next occurring servo sector, and/or may reduce the sensitivity of PES to cross-track head velocity.

In accordance with some embodiments, fewer assumptions of down-track velocity or acceleration may be needed relative to other approaches for compensating for frequency offset errors. For example, although a disc-locked clock can be used to compensate for frequency offset error, such processes may incorrectly assume that the clock frequency varies only slightly from one servo sector to the next and, consequently, may not respond sufficiently fast to rapidly varying down-track velocity. In another example, processes that adjust the sampling rate using timing recovery during the servo preamble may incorrectly assume that the frequency will not change significantly during between the preamble and the servo bursts. In contrast, operations and methods according some embodiments of the present invention assume that the servo read-back frequency varies within the servo burst fields, and they can determine and compensate for such frequency error.

Figure 4:
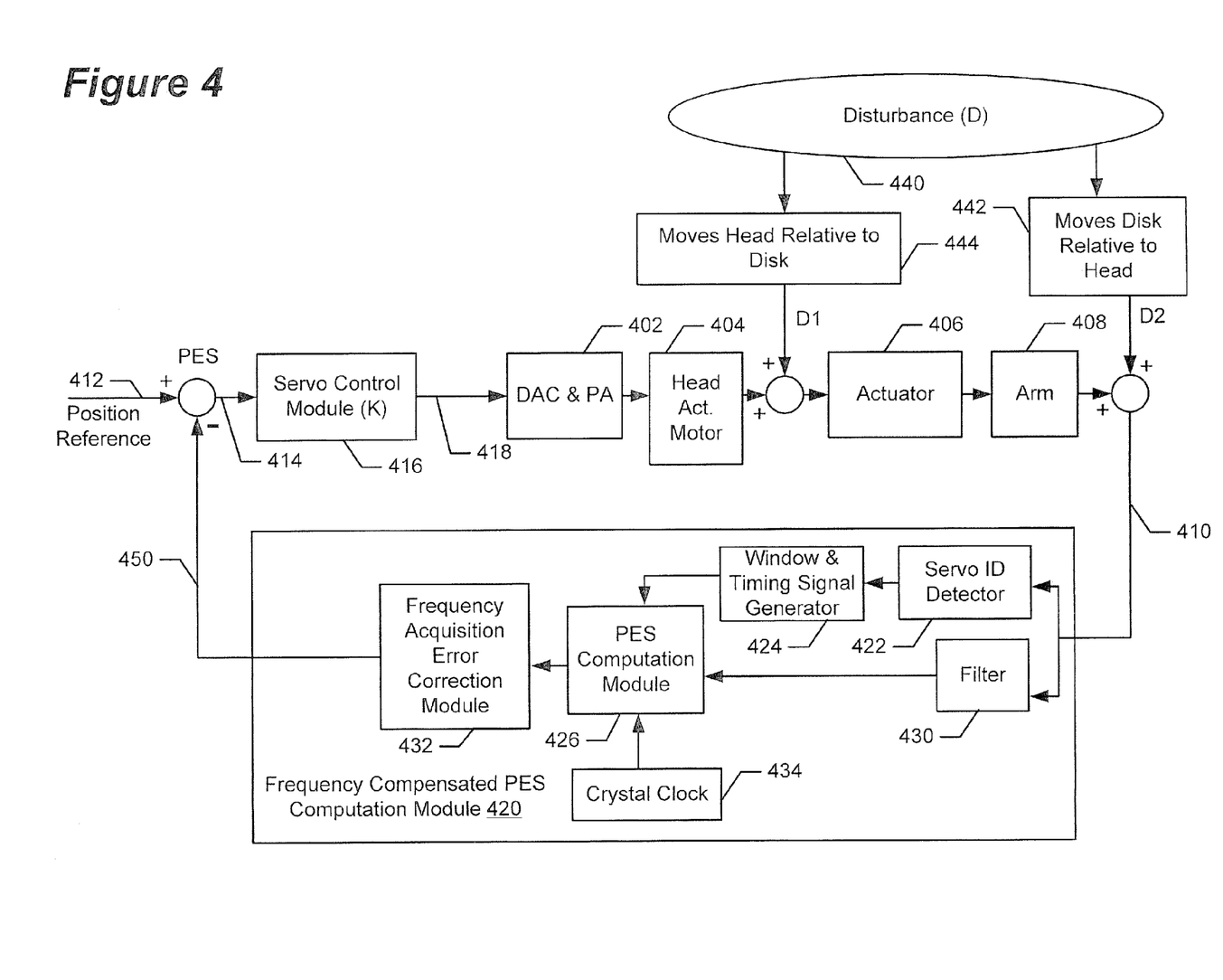
FIG. 4 is a block diagram of a servo control loop configured in a track-following mode and which can be partially embodied within the servo controller of FIG. 1 in accordance with some embodiments.

FIG. 4 is a block diagram of a servo control loop that is configured in a track-following mode and which can be partially embodied within the servo controller 104 of FIG. 1 in accordance with some embodiments. Although some embodiments are described below with regard to FIG. 4 in the context of the discrete time domain (i.e., digital circuitry), using a sampling time index, k, it will be appreciated that other embodiments of the invention can be embodied in the continuous time domain (i.e., analog and/or hybrid circuitry), and may be carried out at least partially within the read write channel 106 and/or within other components of the disk drive circuit 100.

Referring to FIG. 4, the HDA 108 can be modeled in the servo control loop as including a digital-to-analog converter (DAC) and power amplifier 402, a head actuator motor (e.g., voice coil motor) 404, an actuator 406, and an actuator arm 408.

An illustrated disturbance 440 (D) imparts a first disturbance component 442 (e.g., vibration) that moves the head relative to a disk track, and imparts a second disturbance component 444 that moves the disk relative to the head. The second disturbance component 444 may result in, for example, disk speed variations that occur relative to the head due to disk runout (repeatable/non-repeatable runout) from eccentric disk track rotation and/or spindle motor speed variations.

The servo burst fields sensed by the head relative to a given track form components of a read signal 410 that is input to a frequency compensated PES computation module 420. The frequency compensated PES computation module 420 can include a servo ID detector 422, a window and timing signal generator 424, a PES computation module 426, a filter 430, a frequency acquisition error correction module 432, and a crystal clock 434. The servo ID detector 422 and the window and timing signal generator 424 trigger operation of the PES computation module 426 and the frequency compensated PES computation module 420 in response to detecting presence of the preamble and subsequent servo burst field components in the read signal 410. The read signal 410 is filtered by a filter 430 and input to the PES computation module 426 and the frequency compensated PES computation module 420. Although various separate elements have been illustrated for the frequency compensated PES computation module 420 for ease of explanation, it is to be understood that their functionality described herein may be combined into more or less elements.

The frequency acquisition error detection module 426 detects phases between a clock signal from the clock 434 and the servo burst fields in the read signal 410, and determines relative phase differences between the detected phases, and assists with determining the associated frequency acquisition error. The frequency compensated PES computation module 420 determines frequency variation induced error in the detected phases in response to timing of the servo burst fields. The frequency acquisition error correction module 432 generates frequency acquisition error compensated PES components by combining the relative phase differences with the determined frequency variation induced error to compensate for effects of the frequency acquisition error on the detected phases.

The frequency acquisition error compensated PES components are combined with a reference position 412 (desired position) for a head to generate a PES 414. The PES 414 is therefore indicative of the difference between the actual and desired positions of the head (i.e., head position error), and is provided to a servo control module 416. The servo control module 416 responds (e.g., with a transfer gain K) to the value of PES 414 to generate a servo control signal 418.

The servo control signal 418 can be converted by a DAC/power amplifier 402 into an analog signal, assuming it was a digital signal, and then amplified and provided to a head actuator motor 404. The head actuator motor 404 is connected to an actuator 406 which moves an actuator arm 408 in response to the amplified control signal supplied to the head actuator motor 404. The head is connected to the actuator arm 408 (e.g., to an end of the actuator arm 408).

In this way, the servo control loop controls the positioning of the head relative to a selected track on the disk surface during reading/writing of data along the selected track. Moreover, because the frequency compensated PES computation module 420 generates PES components that have been adjusted to at least partially remove effects of frequency error on the servo burst signals in the read signal 410, the servo control loop may be able to more accurately control positioning of the head relative to a track in presence of increased data storage densities and/or disturbances.

The various effects caused by frequency error on the PES components and various operations that can be carried out by the frequency compensated PES computation module 420 to reduce these effects will now be described below.

For purposes of explanation only, a servo sector is assumed to include a header field followed by a sequence of at least one part of a split first servo burst pattern, a second servo burst pattern, and another part of the split first servo burst pattern, such as shown in FIG. 2, although any number of split servo burst patterns may be included therein.

In accordance with some embodiments, the PES computation module 426 generates a sinusoidal component vector for each of the parts of the split first servo burst pattern and for the second servo burst pattern. The frequency acquisition error correction module 432 interpolates among the component vectors for each of the parts of the split first servo burst patterns to generate a synthetic component vector that represents a combination of the parts of the split first servo burst pattern. The interpolation may be carried out at the midpoints of the servo burst signals in the read signal 410 from the parts of the split first servo burst patterns.

For example, for the {½ PS1, PS2, ½ PS1} split burst pattern, a "virtual" or "synthetic" PS1 burst will be determined to exist co-located with the physical PS2 burst. Assuming the accumulated phase error varies linearly within the servo burst fields, the phase of the read signal 410 at the virtual PS1 burst can be interpolated from the phases of the read signal 410 at each of the two physical ½ PS1 bursts. Once the virtual PS1 burst phase has been determined, synthetic SIN and COS components can be computed for the virtual PS1 burst. These synthetic components can be an estimate of the actual SIN and COS components that would have been generated if an actual physical PS1 burst existed at the location of the virtual PS1 burst.

Since the phase of the read signal 410 is assumed to vary linearly with time within a single burst, the burst phase will be defined to be the phase of the read signal 410 at the midpoint of the burst integration interval. The PES computation module 426 may compute a SIN and a COS demodulation component from each servo burst pattern. The synthetic SIN and COS components for the virtual PS1 burst can be formed using the split burst sequence {½ PS1, PS2, ½ PS1}. To generate demodulated PES components that are at least partially compensated to reduce the effect of frequency error, the actual extracted component vectors <SIN, COS> from each of the physical ½ PS1 bursts can be rotated to align them with the interpolated phase of the virtual burst. The components of the resulting rotated component vectors can then be averaged to get the synthesized component vector <SIN 1, COS 1> for the virtual PS1 burst.

The actual extracted component vectors and the synthesized component vectors can be rotated so as to minimize a cost function of the resulting orthogonal components after rotation. When the demodulation components are SIN and COS, the orthogonal component is the COS component. In some embodiments, the cost function that is minimized is the sum of the squares of the COS components after rotation. For the split burst sequence {½ PS1, PS2, ½ PS1}, the frequency acquisition error correction module 432 finds the rotational angle that minimizes the sum of the squares of the second elements of the two component vectors (synthesized <SIN 1, COS 1> and actual <SIN 2, COS 2>) after rotation.

Various operations that may be carried out according to some embodiments will now be described below for a split Null Servo burst pattern: {½ PS1, PS2, ½PS1}, and where the demodulation components use the SIN and COS components that can be generated in a conventional manner by the PES computation module 426. A virtual PS1 burst is assumed to be co-located with the physical PS2 burst. It is further assumed that the read signal 410 for three subsequent points in time are identical: (1) the midpoint of the midpoints of the two ½ PS1 bursts, (2) the midpoint of the virtual PS1 burst, and (3) the midpoint of the actual physical PS2 burst.

The accumulated phase error is represented herein by a phasor $Ae^{j\phi(t)}$ whose amplitude A is constant and whose phase $\phi(t)$ varies linearly with time. Two imaginary burst fields are formed by a single PS1 field covering the entire servo sector and by a single PS2 field also covering the entire servo sector. Both physical and virtual burst fields are considered as windowed segments of these two imaginary burst fields. The discrete-time burst read signal 410 in the presence of uncompensated frequency offset is represented by a sinusoidal signal whose unknown phase varies linearly with time with additive noise. This sinusoidal signal can be expressed as the imaginary part of a complex exponential multiplied by the phasor:

$$r(t_k) = Re\{Ae^{j\phi(t_k)}e^{j\omega t_k}\} + n_k,$$

where $t_k$ is the time at the $k^{th}$ ADC sample. The phasor $A_1 e^{j\phi_1(t_k)}$ is associated with the imaginary PS1 burst, and associate the phasor $A_2 e^{j\phi_2(t_k)}$ with the imaginary PS2 burst. Channel noise will appear primarily through $n_k$; other distortions will appear primarily through the phasors. It is assumed that the phases $\phi_{1(t_k)}$ and $\phi_{2(t_k)}$ are linear functions of time and can be expressed as:

$$\phi_1(t_k) = \phi_1^0 + (\Delta f) t_k; \text{ and}$$

$$\phi_2(t_k) = \phi_2^0 + (\Delta f) t_k,$$

where both phasors $A_1 e^{j\phi_1(t_k)}$ and $A_2 e^{j\phi_2(t_k)}$ share a common frequency offset $\Delta f$ but have different initial phases at a reference time, which can represent the effective time for estimating the phase of the readback signal from the preamble. This reference time may, for example, be the end of the acquire interval within the preamble. As time increases, each of the phasors $A_1 e^{j\phi_1(t_k)}$ and $A_2 e^{j\phi_2(t_k)}$ rotates in the complex plane at the same (in both magnitude and direction) constant angular velocity.

Figure 6:
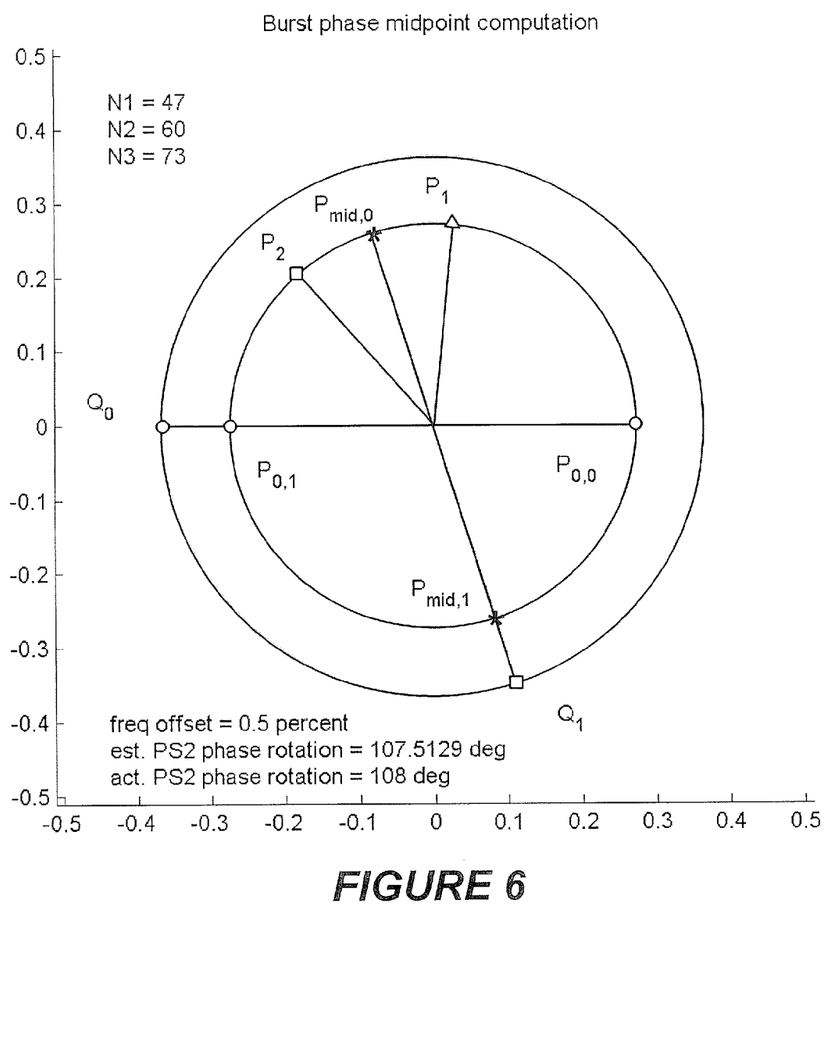
FIG. 6 shows a phase diagram that illustrates operations that may be carried out to interpolate among phase angles of parts of a split servo burst pattern to generate a synthetic (virtual) servo burst vector in accordance with some embodiments.

Details of phase interpolation and component vector synthesis will now be described with reference to FIG. 6. The "starting position" of each of the PS1 and the PS2 phasors is the position at the time of reference phase measurement during the preamble.

There are two possible starting positions of the phasor of the imaginary PS1 burst, depending on whether the off-track position of the head read element is above or below the PS1 null; these are labeled as P0,0 and P0,1 in FIG. 6. The PS1 phasor rotates, either clockwise or anticlockwise, depending on the polarity of the frequency acquisition error, arriving at P1 at the time of the midpoint of the burst integration interval of the first ½PS1 burst, and arrives finally at P2 at the midpoint of the burst integration interval of the second ½ PS1 burst. The two possible interpolated phases at the midpoint of the burst integration interval of the virtual PS1 burst are labeled Pmid,0 and Pmid,1.

The PS2 phasor may start at either of two positions at phase reference measurement time. When the PS2 component vector <SIN 2, COS 2> has a sufficiently large magnitude, as is assumed in the example illustrated in FIG. 6, then the Track ID can be reliably decoded (without suffering from an "indeterminate bit") and the decoded Track ID will uniquely determine the PS2 phasor starting position, labeled Q0 in FIG. 6. The PS2 phasor rotates in the same direction at the same angular velocity as the PS1 phasor, and completes the same number of complete revolutions in traveling from its starting position to the PS2 burst midpoint (Q1 in FIG. 1) as the PS1 phasor completes in traveling from its starting position to its position at the virtual PS1 midpoint.

Although the frequency acquisition error correction module 432 may know that the frequency offset is constant during the burst field, it can infer that the virtual PS1 phasor will be either at position Pmid,0 (which is the midpoint of the shorter circular arc connecting P1 and P2) or at position Pmid,1 (the midpoint of the longer circular arc connecting P1 and P2), using phase interpolation operations as described herein.

Usually frequency offset can be safely assumed to be small enough to ensure the product: (frequency offset measured as a fraction of nominal preamble frequency)×(burst frequency measured as a fraction of nominal preamble frequency)×(number of preamble cycles between the two physical ½ PS1 burst midpoints) is less than one-half. Under this assumption, the PS1 phasor must have traveled from position P1 in FIG. 1 to P2 in FIG. 7 directly, along the shorter arc, without completing more than one complete revolution. The interpolated phase at the virtual PS1 burst is then Pmid,0 (the midpoint of the shorter circular arc).

The phase interpolation and component synthesis operations may be further refined to reduce or eliminate relatively small PES bias caused by phase variation within the burst interval. For extremely large frequency offsets, due to the fact that the burst integration interval for PS2 is longer than that of the ½ PS1 bursts, the reduction in the amplitude of the PS2 component due to phase drift within the burst integration interval, which causes partial cancellation of contributions of different phase, is greater than it is for the ½ PS1 bursts, and consequently a bias is introduced into PES.

To avoid this bias, two virtual ½ PS1 bursts can be formed at positions along a track that cause their two integration intervals to be adjacent to each other, and the union of their two integration intervals to be equal the actual integration interval for PS2. The components of the resulting hypothetical virtual ½ PS1 bursts are then averaged. Using this refinement, the phenomenon of servo burst component reduction due to partial cancellation of contributions of different phase will cause the same relative reduction in PS1 amplitudes as it does in PS2 amplitudes, resulting in zero bias in the frequency acquisition error compensated PES components.

In accordance with some embodiments, the orthogonal component minimization can include using two component vectors, <SIN 1, COS 1> and <SIN 2, COS 2>. The frequency acquisition error correction module 432 can determine the angle θ that minimizes the sum of squares of the COS components of the new component vectors that are obtained by rotating each of the original component vectors by θ. At least one of the component vectors will be the synthesized component vector of a virtual burst. For the split burst: {½ PS1, PS2, ½ PS1}, <SIN 1, COS 1> will be the synthesized component vector using the phase interpolation algorithm described above. After rotation by θ, the resulting SIN components, which have been adjusted so as to reduce or limit the effect of frequency acquisition error thereon, can then be used in conventional processes, such as within the frequency compensated PES computation module 420, to compute PES. In general, two or more component vectors will each be rotated by the same angle θ to minimize the Orthogonal Component Sum-of-Squares (OCSS), and one or more of these component vectors will be synthesized.

Figure 7:
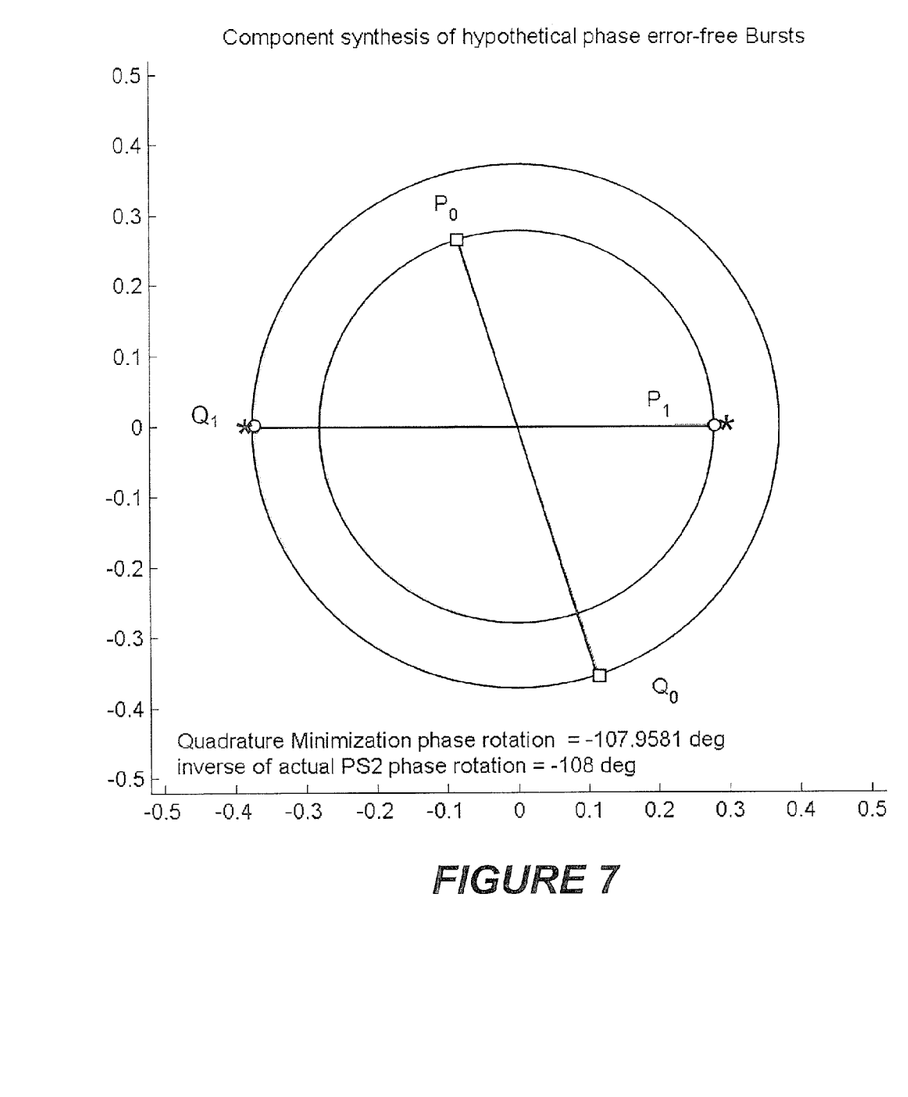
FIG. 7 shows a phase diagram that illustrates operations that may be carried out to rotate servo burst vectors based on the result of the interpolation from FIG. 6 to generate frequency acquisition error compensated PES components in accordance with some embodiments.

The frequency compensated PES computation module 420 may carry out the OCSS minimization as described below. FIG. 7 shows a phase diagram that illustrates operations that may be carried out by the frequency compensated PES computation module 420 to rotate servo burst vectors based on the result of the interpolation from FIG. 6 to generate frequency acquisition error compensated PES components in accordance with some embodiments. Referring to FIG. 7, the exemplary OCSS minimization uses component vectors from the split burst pattern {½ PS1, PS2, ½ PS1}, such as that illustrated in FIG. 2. The component vector <SIN 1, COS 1> may be synthesized using the phase interpolation process described above, and represents the components that might have been extracted from a virtual PS1 burst located where the real PS2 burst actually is. The component vector <SIN 2, COS 2> is the extracted from the real PS2 burst. The PS1 and PS2 component vectors after rotation to minimize the OCSS are labeled P1 and Q1, respectively.

The rotation of a component vector through a positive angle $\theta$ can be represented by the 2×2 rotation matrix:

$$R(\theta) = \begin{bmatrix} \cos(\theta) & -\sin(\theta) \\ \sin(\theta) & \cos(\theta) \end{bmatrix}$$

The rotated component vectors from PS1 and PS2 can be respectively represented by the following matrices:

$$\begin{bmatrix} \tilde{S}_1 \\ \tilde{C}_1 \end{bmatrix} = \begin{bmatrix} \cos(\theta) & -\sin(\theta) \\ \sin(\theta) & \cos(\theta) \end{bmatrix} \begin{bmatrix} S_1 \\ C_1 \end{bmatrix}; \begin{bmatrix} \tilde{S}_2 \\ \tilde{C}_2 \end{bmatrix} = \begin{bmatrix} \cos(\theta) & -\sin(\theta) \\ \sin(\theta) & \cos(\theta) \end{bmatrix} \begin{bmatrix} S_2 \\ C_2 \end{bmatrix}$$

The OCSS minimization process then finds the minimizing value $\theta^*$, which can be represented as $$\theta^* = \arg\min\{\tilde{C}_1^2(\theta) + \tilde{C}_2^2(\theta)\},$$

which can be further represented as $$\theta^* = \arg\min\left\{\left([\sin(\theta) \ \cos(\theta)]\begin{bmatrix} S_1 \\ C_1 \end{bmatrix}\right)^2 + \left([\sin(\theta) \ \cos(\theta)]\begin{bmatrix} S_2 \\ C_2 \end{bmatrix}\right)^2\right\},$$

which can be further represented as $$\theta^* = \arg\min\left\{\begin{array}{l} [\sin(\theta) \ \cos(\theta)]\begin{bmatrix} S_1 \\ C_1 \end{bmatrix}[S_1 \ C_1]\begin{bmatrix} \sin(\theta) \\ \cos(\theta) \end{bmatrix} + \\ [\sin(\theta) \ \cos(\theta)]\begin{bmatrix} S_2 \\ C_2 \end{bmatrix}[S_2 \ C_2]\begin{bmatrix} \sin(\theta) \\ \cos(\theta) \end{bmatrix} \end{array}\right\}$$

which can be further represented as $$\theta^* = \arg\min\left\{[\sin(\theta) \ \cos(\theta)]\left(\begin{bmatrix} S_1 \\ C_1 \end{bmatrix}[S_1 \ C_1] + \begin{bmatrix} S_2 \\ C_2 \end{bmatrix}[S_2 \ C_2]\right)\begin{bmatrix} \sin(\theta) \\ \cos(\theta) \end{bmatrix}\right\},$$

and which can be further represented as $$\theta^* = \arg\min\left\{[\sin(\theta) \ \cos(\theta)]\begin{bmatrix} S_1^2 + S_2^2 & S_1 C_1 + S_2 C_2 \\ S_1 C_1 + S_2 C_2 & C_1^2 + C_2^2 \end{bmatrix}\begin{bmatrix} \sin(\theta) \\ \cos(\theta) \end{bmatrix}\right\}.$$

The algorithm to compute the rotated component vectors $$\begin{bmatrix} \tilde{S}_1 \\ \tilde{C}_1 \end{bmatrix} \text{ and } \begin{bmatrix} \tilde{S}_2 \\ \tilde{C}_2 \end{bmatrix}$$

determined by rotation of the original component vectors through an angle $\theta^*$ can now be described using the following operational steps:

Step 1: Form the matrix $$Q = \begin{bmatrix} S_1^2 + S_2^2 & S_1 C_1 + S_2 C_2 \\ S_1 C_1 + S_2 C_2 & C_1^2 + C_2^2 \end{bmatrix}$$

Step 2: Find the smallest eigenvalue $\lambda_{min}$ of Q using the quadratic equation to find the smaller root of the quadratic in $\lambda$: $\det(\lambda I - Q) = 0$.

Step 3: Find the normalized eigenvector $$u = \begin{bmatrix} u_1 \\ u_2 \end{bmatrix}$$

corresponding to $\lambda_{min}$. Do this by first solving $(\lambda_{min} I - Q)x = 0$ for $$x = \begin{bmatrix} x_1 \\ x_2 \end{bmatrix},$$

and then calculating $$u = \begin{bmatrix} x_1/\sqrt{x_1^2 + x_2^2} \\ x_2/\sqrt{x_1^2 + x_2^2} \end{bmatrix}.$$

Step 4. There are two solutions $\theta^*$ to the minimization problem, differing by $\pi$, and two corresponding solutions for the last row of the rotation matrix $R(\theta^*)$: $\{\sin(\theta^*)\cos(\theta^*)\}$ or $\{-\sin(\theta^*)-\cos(\theta^*)\}$. The last row of $R(\theta^*)$ is ±u. It is not necessary to find $\theta^*$ explicitly.

A binary decision must be made between the two alternatives: $\{\sin(\theta^*)\cos(\theta^*)\} = u$ and $\{\sin(\theta^*)\cos(\theta^*)\} = -u$. This binary decision is equivalent to deciding which of the two possible rotation matrices:

$$R_1(\theta^*) = \begin{bmatrix} \cos(\theta^*) & -\sin(\theta^*) \\ \sin(\theta^*) & \cos(\theta^*) \end{bmatrix} = \begin{bmatrix} u_2 & -u_1 \\ u_1 & u_2 \end{bmatrix}$$

or $$R_2(\theta^*) = \begin{bmatrix} -\cos(\theta^*) & \sin(\theta^*) \\ -\sin(\theta^*) & -\cos(\theta^*) \end{bmatrix} = \begin{bmatrix} -u_2 & u_1 \\ -u_1 & -u_2 \end{bmatrix},$$

gives the correct rotated component vectors $$\begin{bmatrix} \tilde{S}_1 \\ \tilde{C}_1 \end{bmatrix} \text{ and } \begin{bmatrix} \tilde{S}_2 \\ \tilde{C}_2 \end{bmatrix}.$$

Assuming that it is known for at least one of the PS1 or PS2 phasors whether it was aligned with the positive real axis or alternatively with the negative real axis at reference phase measurement time, we choose the rotation which places the given rotated component vector $$\left( \begin{bmatrix} \tilde{S}_1 \\ \tilde{C}_1 \end{bmatrix} \text{ or } \begin{bmatrix} \tilde{S}_2 \\ \tilde{C}_2 \end{bmatrix} \right)$$

closest to the PS1 phasor or PS2 phasor, respectively.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A circuit comprising:
a demodulation module that at least partially removes an effect of frequency acquisition error on a position error signal (PES) using servo readback signals read from a sequence of at least one part of a split first servo burst pattern, a second servo burst pattern, and another part of the split first servo burst pattern on a moving storage media to generate a frequency acquisition error compensated PES component.

2. The circuit of claim 1, wherein the demodulation module generates a sinusoidal component vector for each of the parts of the split first servo burst pattern and for the second servo burst pattern.

3. The circuit of claim 1, wherein the demodulation module combines the component vectors for each of parts of the split first servo burst pattern to generate a synthetic component vector that represents a combination of the parts of the split first servo burst pattern.

4. The circuit of claim 3, wherein the demodulation module interpolates among phase angles of the parts of the split first servo burst pattern to generate the synthetic component vector.

5. The circuit of claim 4, wherein the demodulation module averages the phase angles of the parts of the split first servo burst pattern to generate the synthetic component vector.

6. The circuit of claim 3, wherein the demodulation module determines a rotation matrix with a phase angle that reduces a sum of squares of the first and second synthetic cosine components.

7. The circuit of claim 6, wherein the demodulation module rotates the first and second synthetic pairs of sine and cosine components in response to the rotation matrix to generate phase rotated synthetic pairs of sine and cosine components, and generates the frequency acquisition error compensated PES component using the phase rotated synthetic pairs of sine and cosine components.

8. The circuit of claim 1, wherein the demodulation module generates pairs of sine and cosine components for each of the parts of the split first servo burst pattern and for the second servo burst pattern, and determines frequency acquisition error in response to a phase relationship between the pairs of sine and cosine components.

9. The circuit of claim 8, wherein the demodulation module interpolates among the pairs of sine and cosine components for each of the parts of the split first servo burst pattern to generate a synthetic pair of sine and cosine components.

10. The circuit of claim 9, wherein the demodulation module averages the pairs of sine and cosine components for each of the parts of the split first servo burst pattern to generate the synthetic pair of sine and cosine components.

11. The circuit of claim 9, wherein the demodulation module determines a rotation matrix with a phase angle that reduces a sum of squares of the first and second synthetic cosine components.

12. The circuit of claim 11, wherein the demodulation module rotates the first and second synthetic pairs of sine and cosine components in response to the rotation matrix to generate phase rotated synthetic pairs of sine and cosine components, and generates the frequency acquisition error compensated PES component using the phase rotated sine and cosine components.

13. The circuit of claim 1, wherein the demodulation module generates a sinusoidal component vector for each part of the split first and second servo burst patterns, interpolates among phase angles of the parts of the first servo burst pattern to generate a first synthetic component vector, interpolates among phase angles of the parts of the second servo burst pattern to generate a second synthetic component vector, determines a rotation matrix with a phase angle that reduces a sum of squares of the first and second synthetic cosine components, rotates the first and second synthetic pairs of sine and cosine components in response to the rotation matrix to generate phase rotated synthetic pairs of sine and cosine components, and generates the frequency acquisition error compensated PES component using the phase rotated first and second synthetic pairs of sine and cosine components.

14. The circuit of claim 13, wherein the demodulation module generates pairs of sine and cosine components for each part of the split first and second servo burst patterns, interpolates among the pairs of sine and cosine components of the split first servo burst patterns to generate a first synthetic pair of sine and cosine components, interpolates among the pairs of sine and cosine components of the split second servo burst patterns to generate a second synthetic pair of sine and cosine components, determines a rotation matrix with a phase angle that reduces a sum of squares of the first and second synthetic cosine components, and rotates the first and second synthetic pairs of sine and cosine components in response to the rotation matrix to generate phase rotated synthetic pairs of sine and cosine components, and generates the frequency acquisition error compensated PES component using the phase rotated synthetic pairs of sine and cosine components.

15. The circuit of claim 1, wherein the at least one part of a split first servo burst pattern and the another part of the split first servo burst pattern are spaced apart along one side of a track centerline with the second servo burst pattern on another side of the track centerline and positioned between the split first servo burst pattern parts.

16. A method comprising:
at least partially removing an effect of frequency acquisition error on a position error signal (PES) using a sequence of at least one part of a split first servo burst pattern, a second servo burst pattern, and another part of the split first servo burst pattern on a moving storage media to generate a frequency acquisition error compensated PES component.

17. The method of claim 16, further comprising:

generating a sinusoidal component vector for each of the parts of the split first servo burst pattern and for the second servo burst pattern;

interpolating among phase angles of the parts of the split first servo burst pattern to generate a synthetic component vector; and determining a phase angle that reduces a sum of squares of the synthetic component vector and the component vector for the second servo burst pattern.

18. The method of claim 17, further comprising:

rotating the synthetic component vector and the component vector for the second servo burst pattern in response to the determined phase angle to generate phase rotated component vectors; and generating the frequency acquisition error compensated PES component using the phase rotated component vectors.

19. The method of claim 16, further comprising:

generating pairs of sine and cosine components for each of the parts of the split first servo burst pattern and for the second servo burst pattern;

interpolating among the pairs of sine and cosine components of the part of the split first servo burst pattern to generate a synthetic pair of sine and cosine components;

determining a phase angle that reduces a sum of squares of the synthetic cosine component and the cosine component for the second servo burst pattern; and rotating the synthetic sine and cosine components and the sine and cosine components for the second servo burst pattern in response to the determined phase angle to generate phase rotated sine and cosine components; and generating the frequency acquisition error compensated PES component using the phase rotated sine and cosine components.

20. A system comprising:

a demodulator that at least partially removes an effect of frequency acquisition error on a position error signal (PES) using a sequence of servo burst patterns along a track to generate a compensated PES component, the sequence of servo burst patterns including at least one part of a split first servo burst pattern, a second servo burst pattern, and another part of the split first servo burst pattern; and a controller that controls movement of a read/write head relative to the track on a storage media in response to the frequency acquisition error compensated PES component.

* * * * *